United States Patent
Rosa et al.

(10) Patent No.: US 12,426,090 B2
(45) Date of Patent: Sep. 23, 2025

(54) OPERATION RELATED TO LBT PROCESS

(71) Applicant: Nokia Technologies Oy, Espoo (FI)

(72) Inventors: Claudio Rosa, Randers NV (DK); Timo Lunttila, Espoo (FI); Tao Tao, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 446 days.

(21) Appl. No.: 17/907,700

(22) PCT Filed: Apr. 9, 2020

(86) PCT No.: PCT/CN2020/084058
§ 371 (c)(1),
(2) Date: Sep. 29, 2022

(87) PCT Pub. No.: WO2021/203388
PCT Pub. Date: Oct. 14, 2021

(65) Prior Publication Data
US 2023/0135452 A1   May 4, 2023

(51) Int. Cl.
*H04W 74/08* (2024.01)
*H04L 27/26* (2006.01)
(Continued)

(52) U.S. Cl.
CPC ..... *H04W 74/0816* (2013.01); *H04L 27/2605* (2013.01); *H04W 72/1268* (2013.01)

(58) Field of Classification Search
CPC .......... H04W 74/0816; H04W 72/1268; H04L 27/2605
See application file for complete search history.

(56) References Cited

U.S. PATENT DOCUMENTS

2016/0007368 A1   1/2016   Moon et al.
2019/0229970 A1*  7/2019   Bhattad ................. H04W 72/23
(Continued)

FOREIGN PATENT DOCUMENTS

CN   106664690 A   5/2017
CN   108289325 A   7/2018
(Continued)

OTHER PUBLICATIONS

Office action received for corresponding Chinese Patent Application No. 202110381078.2, dated Dec. 26, 2023, 6 pages of office action and no page of translation available.
(Continued)

*Primary Examiner* — Brenda H Pham
(74) *Attorney, Agent, or Firm* — SQUIRE PATTON BOGGS (US) LLP

(57) ABSTRACT

Example embodiments of the present disclosure relate to a solution for performing an operation related to a listen-before-talk (LBT) process for a transmission. In an aspect, an apparatus determines a duration of a gap between an end point of a first transmission to be transmitted by a further apparatus and a start point of a cyclic prefix extension prior to a second transmission to be transmitted by the apparatus. The apparatus performs an operation related to an LBT process for the second transmission based on comparisons between the duration of the gap and a plurality of threshold durations associated with a plurality of types of LBT processes. Example embodiments of the present disclosure can increase or even maximize the likelihood of the success of LBT processes.

18 Claims, 8 Drawing Sheets

(51) Int. Cl.
  *H04W 72/1268* (2023.01)
  *H04W 74/0816* (2024.01)

(56) References Cited

U.S. PATENT DOCUMENTS

| | | |
|---|---|---|
| 2020/0021423 A1 | 1/2020 | Liu et al. |
| 2020/0037354 A1 | 1/2020 | Li et al. |
| 2020/0107277 A1 | 4/2020 | Jeon et al. |

FOREIGN PATENT DOCUMENTS

| | | |
|---|---|---|
| CN | 109076603 A | 12/2018 |
| CN | 113196859 A | 7/2021 |
| EP | 3873155 A1 | 9/2021 |
| WO | 2018/031068 A1 | 2/2018 |
| WO | 2019/216816 A2 | 11/2019 |
| WO | 2020/033363 A1 | 2/2020 |
| WO | 2020/132048 A1 | 6/2020 |

OTHER PUBLICATIONS

Extended European Search Report received for corresponding European Patent Application No. 20930575.4, dated Nov. 10, 2023, 11 pages.

Notification of Second Office Action dated Jul. 18, 2024 corresponding to Chinese Patent Application No. 2021103810782, with English translation thereof.

Office Action received for corresponding Japanese Patent Application No. 2022-562038, dated Nov. 20, 2023, 2 pages of office action and 2 pages of summary available.

"Channel access procedures for NR-U", 3GPP TSG RAN WG1 #99, R1-1912874, Agenda: 7.2.2.2.1, NTT Docomo Inc, Nov. 18-22, 2019, pp. 1-6.

"3rd Generation Partnership Project; Technical Specification Group Radio Access Network; Physical layer procedures for shared spectrum channel access (Release 16)", 3GPP TS 37.213, V16.0.0, Dec. 2019, pp. 1-25.

"IEEE 802.11", Wikipedia, Retrieved on Sep. 29, 2022, Webpage available at : https://en.wikipedia.org/wiki/IEEE_802.11.

International Search Report and Written Opinion received for corresponding Patent Cooperation Treaty Application No. PCT/CN2020/084058, dated Jan. 4, 2021, 9 pages.

"Discussion on channel access procedure", 3GPP TSG RAN WG1 #98bis, R1-1911052, Agenda: 7.2.2.2.1, MediaTek Inc, Oct. 14-20, 2019, pp. 1-24.

"Remaining details in channel access procedures", 3GPP TSG RAN WG1 #99, R1-1912088, Agenda: 7.2.2.2.1, MediaTek Inc, Nov. 18-22, 2019, pp. 1-25.

Notice of the result of substantive examination pursuant to article 62(3) dated Feb. 18, 2025, corresponding to Indonesian Patent Application No. P00202212505, with English translation thereof.

Indonesian Office Action, with English language translation, corresponding to ID Application No. P00202212505, dated Jun. 2, 2025.

* cited by examiner

OPERATION RELATED TO LBT PROCESS

RELATED APPLICATION

This application was originally filed as PCT Application No. PCT/CN2020/084058, filed on 9 Apr. 2020, which is incorporated herein by reference in its entirety.

FIELD

Example embodiments of the present disclosure generally relate to the field of communication, and in particular to apparatuses, a method, and a computer readable medium for performing an operation related to a listen-before-talk (LBT) process for a transmission.

BACKGROUND

The latest developments of the 3GPP standards are referred to as Long Term Evolution (LTE) of Evolved Packet Core (EPC) network and Evolved Universal Mobile Telecommunications System (UMTS) Terrestrial Radio Access Network (E-UTRAN), also commonly termed as '4G.' In addition, the term '5G New Radio (NR)' refers to an evolving communication technology that is expected to support a variety of applications and services. The 5G NR is part of a continuous mobile broadband evolution promulgated by the Third Generation Partnership Project (3GPP) to meet new requirements associated with latency, reliability, security, scalability (for example, with Internet of Things), and other requirements. Some aspects of the 5G NR may be based on the 4G Long Term Evolution (LTE) standards.

Presently, transmissions in a communication network, for example, the configured grant physical uplink shared channel (CG-PUSCH) transmissions in 5G New Radio in Unlicensed Spectrum (NR-U), can make use of a Cyclic Prefix (CP) extension of variable durations to avoid collisions between communication devices, for example, terminal devices. The basic idea is to have different start points for different terminal devices to transmit transmissions. As terminal devices may perform a clear channel assessment (CCA) or listen-before-talk (LBT) operation immediately prior to their transmissions, a terminal device starting its transmission earlier can block other terminal devices from transmitting later. That is, the CP extension acts as a reservation signal, indicating to other terminal devices performing LBT processes that the channel is already occupied. However, operations performed by a communication device for LBT processes still need to be optimized, so as to improve the performance of communications.

SUMMARY

In general, example embodiments of the present disclosure provide a solution for performing an operation related to an LBT process for a transmission.

In a first aspect, there is provided an apparatus. The apparatus comprises at least one processor and at least one memory storing computer program codes. The at least one memory and the computer program codes are configured, with the at least one processor, to cause the apparatus to determine a duration of a gap between an end point of a first transmission to be transmitted by a further apparatus and a start point of a cyclic prefix extension prior to a second transmission to be transmitted by the apparatus. The at least one memory and the computer program codes are also configured, with the at least one processor, to cause the apparatus to perform an operation related to an LBT process for the second transmission based on comparisons between the duration of the gap and a plurality of threshold durations associated with a plurality of types of LBT processes.

In a second aspect, there is provided a method. The method comprises determining, at an apparatus, a duration of a gap between an end point of a first transmission to be transmitted by a further apparatus and a start point of a cyclic prefix extension prior to a second transmission to be transmitted by the apparatus. The method also comprises performing an operation related to an LBT process for the second transmission based on comparisons between the duration of the gap and a plurality of threshold durations associated with a plurality of types of LBT processes.

In a third aspect, there is provided an apparatus. The apparatus comprises means for determining a duration of a gap between an end point of a first transmission to be transmitted by a further apparatus and a start point of a cyclic prefix extension prior to a second transmission to be transmitted by the apparatus. The apparatus also comprises means for performing an operation related to an LBT process for the second transmission based on comparisons between the duration of the gap and a plurality of threshold durations associated with a plurality of types of LBT processes.

In a fourth aspect, there is provided a non-transitory computer readable medium storing program instructions for causing an apparatus to perform at least the method according to the second aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar elements.

DETAILED DESCRIPTION

Figure 1:
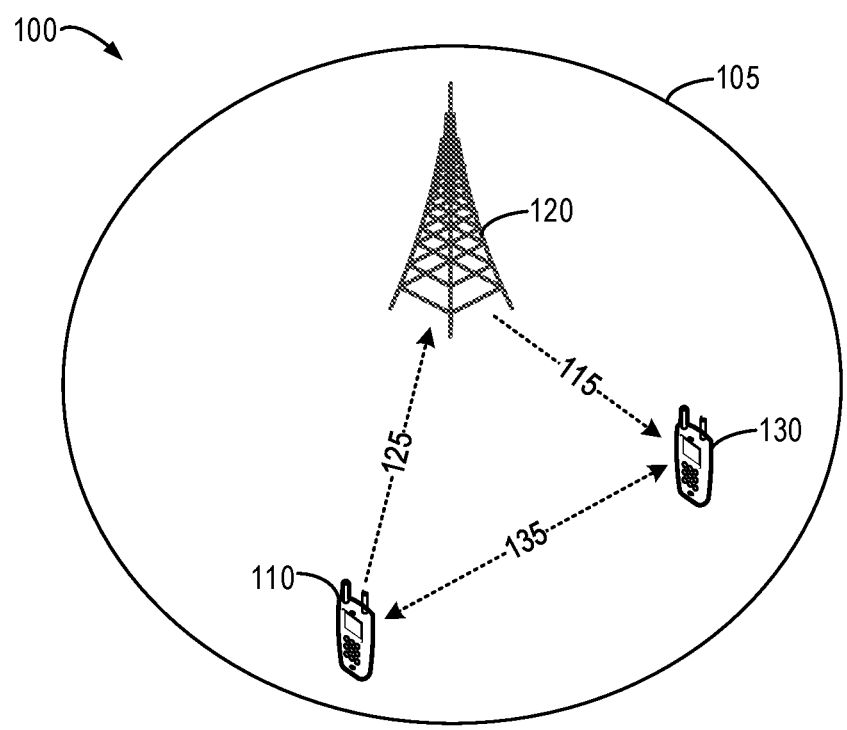
FIG. 1 illustrates a schematic diagram of a communication environment in which some example embodiments of the present disclosure can be implemented.

Principles of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every example embodiment includes the particular feature, structure, or characteristic. Moreover, such phrases are not necessarily referring to the same example embodiment. Further, when a particular feature, structure, or characteristic is described in connection with an example embodiment, it is submitted that it is within the knowledge of one skilled in the art to affect such feature, structure, or characteristic in connection with other example embodiments whether or not explicitly described.

It shall be understood that although the terms "first" and "second" or the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "has," "having," "includes" and/or "including," when used herein, specify the presence of stated features, elements, components and/or the like, but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as NR-U, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Example embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), a radio access network (RAN) node, an evolved NodeB (eNodeB or eNB), a NR NB (also referred to as a gNB), a Remote Radio Unit (RRU), a radio header (RH), an infrastructure device for a V2X (vehicle-to-everything) communication, a Transmission/Reception Point (TRP), a Reception Point (RP), a remote radio head (RRH), a relay, an Integrated Access and Backhaul (IAB) node, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), an unmanned aerial vehicle (UAV), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "terminal device," "communication device," "terminal," "user equipment" and "UE" may be used interchangeably.

As used herein, the term "resource," "transmission resource," "resource block," "physical resource block," "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some example embodiments of the present disclosure. It is noted that example embodiments of the present disclosure are equally applicable to other resources in other domains.

As mentioned above, transmissions in a communication network (for example, the CG-PUSCH transmissions in NR-U) can make use of a CP extension of variable durations to avoid collisions between communication devices. More specifically, a communication device (for example, a terminal device) may be configured with a set of up to 7 possible starting positions for the CP extension, out of which the terminal device can select one in a (pseudo-) random manner. This may be the case when the CG-PUSCH transmission occupies all physical resource blocks (PRBs) of a 20 MHz channel.

Alternatively, a communication device (for example, a terminal device) may be configured with a single starting position out of a predefined number (for example, 7) of possible options. This may be the case when the CG-PUSCH transmission occupies less than all PRBs of a 20 MHz channel. In RAN1 #100-e, there was the related agreement as follows. For values of the CP extension, 7 possible starting positions may be introduced. The indices to 7 possible starting positions can be specified. A UE is configured with indices to values from the indices to the 7 values. The exact values of those 7 starting positions are yet undetermined.

In addition to the values of the starting position of the CP extension, there may be a LBT type (for example, a UL LBT type, also referred to as a type of UL channel access procedure) associated with each starting position. Currently, NR-U may support several LBT types (for example, UL LBT types) as follows. Type 1 LBT may refer to the Cat4 LBT with exponential backoff, Type 2A LBT may refer to the Cat2 single shot LBT (25 μs measurement duration), Type 2B LBT may refer to the Cat2 single shot LBT (16 μs measurement duration), and Type 2C LBT may refer to the Cat1 LBT, namely, transmissions without channel sensing. However, there are various aspects of problems in the traditional solutions.

The first aspect of problems may be termed as an issue of gNB overriding. According to a pre-determined configuration of the functions of symbols, the gNB shall stop DL transmissions after a pre-determined symbol and the next symbol may be used for UL transmissions. However, the gNB may override this pre-determined allocation to use the resources in the next symbol and later for other purpose, for example, for Ultra-Reliable Low Latency Communication (URLLC) DL transmission. In an example, the gNB transmits an additional one-symbol DL transmission in the next symbol. When this overriding happens, UL CG transmissions using the pre-configured CP extension value and LBT type may not be feasible anymore. Note that this issue may happen in the case of 30 kHz subcarrier spacing (SCS) and 60 kHz SCS, in which the configured CP duration may be larger than one OFDM symbol.

The second aspect of problems may be termed as an issue of a potential collision between a scheduled UL transmission and a UL CG transmission. This may be the case where there is no overlap between DL and CG-PUSCH resources. The legacy starting positions defined for UL CG transmissions within the gNB acquired Channel Occupancy Time (COT) only allow starting positions of 34 μs (or larger) with respect to the UL symbol boundary. Assuming there is no Timing Advance (that is, TA=0), this means that the gap between a DL transmission and the start of an UL CG transmission within the gNB-acquired COT can be at minimum 34 μs.

The main idea of defining such a minimum value of the PUSCH starting position for UL CG transmissions within the gNB acquired COT is to provide the gNB with means to override UL CG transmissions with scheduled PUSCH transmissions. That is also why it is currently specified that UEs are only allowed to use LBT Type 2A for transmissions on UL CG resources within the gNB-acquired COT. With these assumptions, if the gap between a DL transmission and a scheduled UL transmission is for example 25 μs or less, a UE with UL CG resources will likely not be able to transmit using Type 2A LBT.

In case UL CG resources are used to carry small data packets with low latency requirements, it may be desirable to allow for example frequency division multiplexing of scheduled UL transmission and UL CG transmission. To achieve this, as the gap between DL and scheduled UL transmissions can change from COT to COT, it is desirable to introduce specifically designed values of the PUSCH starting positions, as well as mechanisms to dynamically adapt the LBT Type based on the slot format and the configured PUSCH starting position.

The third aspect of problems is related to Rel-15 LTE Licensed Assisted Access (LAA) feature Autonomous UL (AUL), which also supports multiple starting positions for CP extensions prior to a PUSCH transmission, in addition to NR-U configured grants. The supported start points are given by the following radio resource control (RRC) parameters: "aul-StartingPartialBW-InsideMCOT-r15 ENUMERATED {o34, o43, o52, o61, oOS1}, aul-StartingPartialBW- OutsideMCOT-r15 ENUMERATED {o16, o25, o34, o43, o52, o61, oOS1}." Here o16, o25, o34 and so on denote starting the CP extension 16, 25, and 34 microseconds after a symbol boundary, respectively. The oOS1 means that there is no CP extension prior to the PUSCH at all. The basic principle is to place the start points 9 μs apart, as 9 μs is also the duration of one CCA slot in the typical LBT procedures.

In Rel-15 LTE LAA Autonomous Uplink (AUL), the eNB may indicate, by using the "UL duration and offset" field and "COT sharing indication for AUL" field in the common physical downlink control channel (C-PDCCH), that a UE configured with autonomous UL transmissions may perform a Type 2A channel access procedure for the autonomous UL transmissions within eNB's COT. However, LTE LAA does not support the more efficient Type 2B and Type 2C UL channel access procedures.

In view of the above problems and other potential problems in the traditional solutions, example embodiments of the present disclosure provide a solution for performing an operation related to an LBT process for a transmission. In particular, some example embodiments of the present disclosure may determine an appropriate starting position (for example, choose a possible starting position) of a CP extension before a transmission to maximize the likelihood of channel access in different scenarios, for example, within and outside of a COT for both full and partial bandwidth transmissions. In addition, some example embodiments of the present disclosure may determine which LBT type to use for a CP extension under difference conditions. Moreover, some example embodiments of the present disclosure take the TA into account when select the LBT type and a starting position of a CP extension.

A plurality of advantages can be achieved through example embodiments of the present disclosure. In particular, example embodiments of the present disclosure can solve the problems in the traditional solutions, for example, the issues of gNB overriding and possible collisions between scheduled UL and UL CG transmissions, such that the likelihood the success of LBT processes can be increased or even maximized. More generally, example embodiments of the present disclosure can improve the performance of a communication network. Principles and implementations of example embodiments of the present disclosure will be described in detail below with reference to the figures.

FIG. 1 illustrates a schematic diagram of a communication environment 100 in which some example embodiments of the present disclosure can be implemented. As shown in FIG. 1, the communication environment (also referred to as a communication network) 100 includes a first device 110 and a second device 120 which can communicate with each other. As used herein, the first device 110 may also be referred to as an apparatus 110 and the second device 120 may also be referred to as a further apparatus 120. The communication environment 100 also includes a third device 130, which can communicate with the second device 120. In some example embodiments, the first device 110 and the third device 130 can directly communicate with each other.

In general, the first device 110, the second device 120, and the third device 130 can be any suitable devices that can perform communications among them. In some example embodiments, the first device 110 and the third device 130 may be terminal devices, and the second device 120 may be a network device. For example, the second device 120 can be a serving device of the first device 110 and the third device 130 located in a cell 105 of the second device 120.

During the communications among the first device 110, the second device 120 and the third device 130, the second device 120 may transmit a first transmission 115 to the third device 130, for example, a downlink transmission. It should be noted that although the first transmission 115 is depicted as from the second device 120 to the third device 130, this depiction is only for example without suggesting any limitation. In some example embodiments, the first transmission 115 may be a transmission from the second device 120 to the first device 110. In addition, the first device 110 can transmit a second transmission 125 to the second device 120. In some example embodiments, the second transmission 125 may be a configured grant physical uplink shared channel (CG-PUSCH) transmission in NR-U, for example, which CG-PUSCH transmission can be transmitted using pre-allocated resources.

It should be noted that although the second transmission 125 is depicted as from the first device 110 to the second device 120, this depiction is only for example without suggesting any limitation. In some example embodiments, the second transmission 125 can be a transmission from the first device 110 to the third device 130 via a sidelink (also referred to as device-to-device, D2D) channel 135, or a transmission from the first device 110 to another terminal device not shown. In the following, the transmission from the first device 110 to the second device 120 may be taken as an example of the second transmission 125 to describe various example embodiments of the present disclosure. However, it should be noted that example embodiments of the present disclosure are not limited to the second transmission 125 from the first device 110 to the second device 120, but are equally applicable to a second transmission from the first device 110 to any other communication device.

In some example embodiments, the first device 110 can transmit the second transmission 125 on common transmission resources (such as time resources and/or frequency resources) for a plurality of terminal devices including the first device 110. Therefore, the plurality of terminal devices including the first device 110 can transmit respective CG-PUSCH transmissions using respective CP extensions of variable durations to avoid collisions between the terminal devices. For example, the first device 110 can transmit a CP extension before the second transmission 125. As used herein, the combination of the CP extension and the second transmission 125 may be referred to a transmission (for example, an uplink transmission) from the first device 110 and the second device 120, and the second transmission 125 refers to the portions of a transmission without the CP extension.

In addition to the CP extensions of variable durations, before transmitting the transmission including the CP extension and the second transmission 125, the first device 110 may perform a listen-before-talk (LBT, also referred to as a clear channel assessment) operation to determine whether another terminal device is transmitting a transmission to the second device 120 on the common transmission resources. If the first device 110 detects that the channel is clear, the first device 110 can transmit the transmission including the CP extension and the second transmission 125. Otherwise, if the first device 110 determines the channel as occupied, the first device 110 can delay or cancel the transmission including the CP extension and the second transmission 125.

As mentioned, there are various LBT types (also referred to as types of channel access procedures) available for the first device 110 to perform an LBT operation before the transmission including the CP extension and the second transmission 125. In some example embodiments, based on different durations of the gap between the end position of the first transmission 115 and the starting position of the CP extension prior to the second transmission 125, the first device 110 can perform an suitable operation related to the LBT process for the second transmission 125. For example, the first device 110 may select a suitable type of LBT process for performing an LBT operation for the second transmission 125. In some situations, the first device 110 can adjust the starting position of the CP extension for performing an LBT operation. In some other situations, the first device 110 can drop the LBT operation for the second transmission 125 and also drop the second transmission 125. By performing such a suitable operation related to the LBT process, the likelihood the success of the LBT process can be increased or even maximized.

Although the first device 110, the second device 120, and the third device 130 are described in the communication environment 100 of FIG. 1, example embodiments of the present disclosure may be equally applicable to any other suitable communication devices in communication with one another. That is, example embodiments of the present disclosure are not limited to the example scenario of FIG. 1. In this regard, it is noted that although the first device 110 and the third device 130 are schematically depicted as mobile phones in FIG. 1, and the second device 120 is schematically depicted as a base station in FIG. 1, it is understood that this depiction is only for example without suggesting any limitation. In other example embodiments, the first device 110, the second device 120, and the third device 130 may be any other communication devices, for example, wireless communication devices.

It is to be understood that the number of communication devices, the number of communication links, and the number of other elements as shown in FIG. 1 are only for the purpose of illustration without suggesting any limitations. The communication environment 100 may include any suitable number of communication devices, any suitable number of communication links, and any suitable number of other elements adapted for implementing example embodiments of the present disclosure. In addition, it would be appreciated that there may be various wireless communications as well as wireline communications (if needed) among all the communication devices.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G), NR-U and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
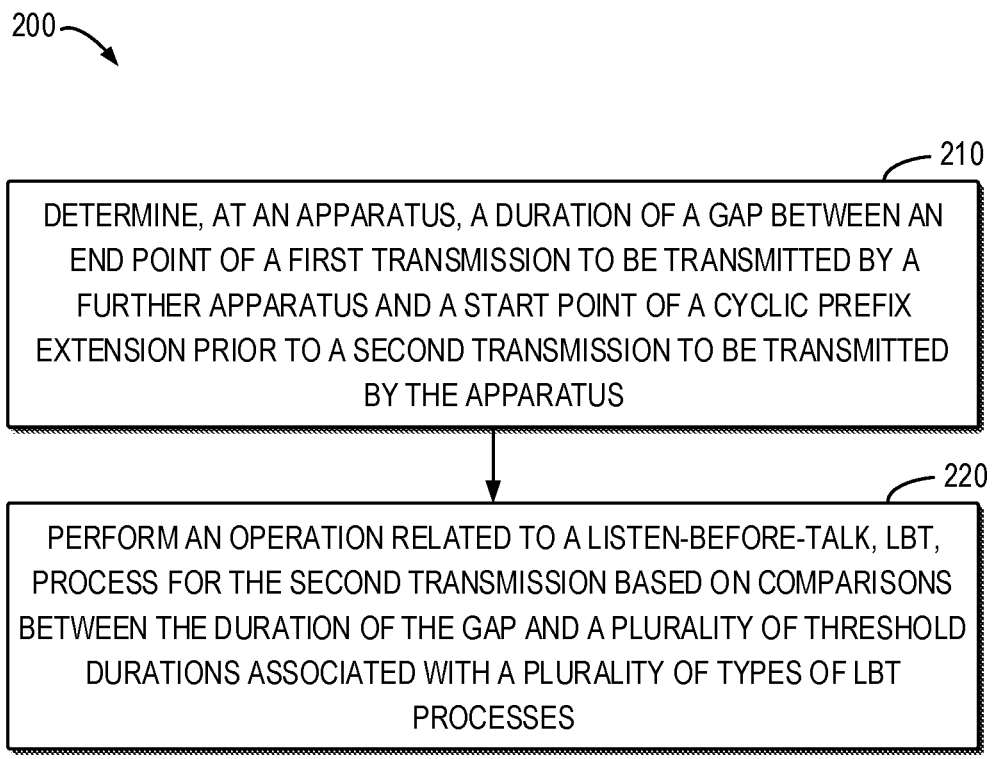
FIG. 2 illustrates a flowchart of an example method in accordance with some example embodiments of the present disclosure.

FIG. 2 illustrates a flowchart of an example method 200 in accordance with some example embodiments of the present disclosure. In some example embodiments, the method 200 can be implemented at a device in a communication network, such as the first device 110 as shown in FIG. 1. Additionally or alternatively, the method 200 can also be implemented at other devices shown in FIG. 1. In some other example embodiments, the method 200 may be implemented at devices not shown in FIG. 1.

At block 210, the first device 110 can determine a duration of a gap between an end point of the first transmission 115 to be transmitted by the second device 120 and a start point of a CP extension prior to the second transmission 125 to be transmitted by the first device 110 to the second device 120. There may be various manners for the first device 110 to determine the duration of the gap. For example, the first device 110 may monitor the first transmission 115 by the second device 120 and detect the end point of the first transmission 115. Then, the first device 110 may select an appropriate start point of the CP extension prior to the second transmission 125. Based on the detected end point and the selected start point, the first device 110 may calculate the duration of the gap between them.

In some other example embodiments, the start point of the CP extension can be configured by the second device 120 via one or more configuration messages. In this way, the start points of the CP extensions for a plurality of terminal devices can be configured by a network device in a centralized and flexible manner, thereby improving the frequency domain multiplexing by the plurality of terminal devices. In addition, the operations at a terminal device can be simplified, since the terminal device does not need to determine the start point of the CP extension.

More specifically, the first device 110 may receive a configuration message (for example, an RRC message) from the second device 120. The configuration message can include time and frequency resources for the second transmission 125 and the duration of the CP extension. Then, the first device 110 may determine the start point of the CP extension based on the configuration message, for example, according to the start point of the second transmission 125 and the duration of the CP extension.

Similarly, the end point of the first transmission 115 can also be configured by the second device 120 and signal to the plurality of terminal devices including the first device 110 via a configuration message. In this way, the operations at a terminal device can be simplified, since the terminal device does not need to detect the end point of the first transmission 115 from the second device 120. More specifically, the first device 110 may receive a configuration message from the second device 120. Then, the first device 110 may determine the end point of the first transmission from the configuration message.

In some example embodiments, the time and frequency resources for the second transmission 125, the duration of the CP extension, and the end point of the first transmission 115 can be contained in a signal configuration message, for example, an RRC message. In some other example embodiments, any two or all of the time and frequency resources for the second transmission 125, the duration of the CP extension, and the end point of the first transmission 115 may be transmitted via separate messages. For example, if the second transmission 125 is a CG-PUSCH transmission, the first device 110 may receive a configuration message for the CP extension values to be applied prior to the CG-PUSCH transmission. This may be part of an RRC configuration from the second device 120. Additionally, prior to an intended CG-PUSCH transmission, the first device 110 can detect the group-common PDCCH (DCI format 2_0), and based on its contents (such as, Slot Format Indicator (SFI), and/or COT duration) determine the COT structure (namely, whether the symbols in the COT are DL "D", UL "U", or flexible "F").

Based on the indicated COT structure, in particular the location of the DL symbols, the first device 110 can calculate the duration of the gap between the end of the latest DL transmission (before the intended CG-PUSCH transmission) by the second device 120, and the start point of the CP extension prior to the intended CG-PUSCH transmission. In the following, various durations of the gap will be described with reference to FIGS. 3-7 using a CG-PUSCH transmission as an example of the second transmission 125. However, it should be noted that example embodiments of the present disclosure are equally applicable to any transmission between any two communication devices.

Figure 3:
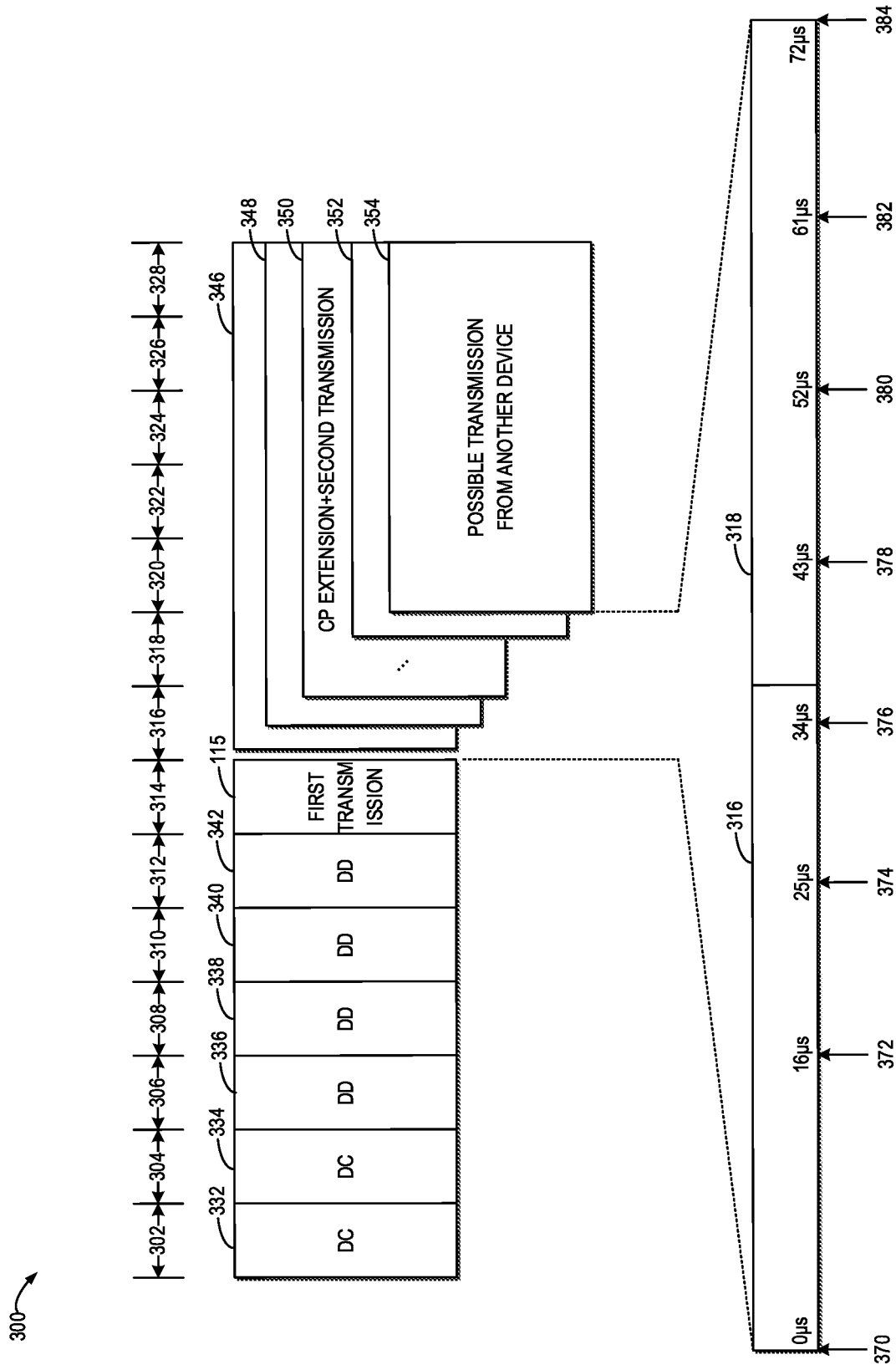
FIG. 3 illustrates an example scenario which shows some example start points for a first device to transmit a CP extension before a second transmission to a second device after a first transmission by the second device, in accordance with some example embodiments of the present disclosure.

FIG. 3 illustrates an example scenario 300 which shows some example start points 372, 374, 376, 378, 380, 382 and 384 for the first device 110 to transmit the CP extension before the second transmission 125 to the second device 120 after the first transmission 115 by the second device 120, in accordance with some example embodiments of the present disclosure. Although FIG. 3 shows particular start points of the CP extension prior to the second transmission 125, it is understood that this depiction is only for example without suggesting any limitation. In other example embodiments, the start point of the CP extension may be any suitable time point before the second transmission 125.

As shown in FIG. 3, there are 14 OFDM symbols 302 to 328 depicted in this example. Each of the OFDM symbols 302 to 328 has duration of 36 μs. However, it should be noted that the duration of one OFDM symbol may be different in other example embodiments with different numerology, such as different subcarrier spacing. In addition, although FIG. 3 employs a particular number of OFDM symbols of a particular duration as examples of time units to describe some example embodiments of the present disclosure, it is understood that this depiction is only for example without suggesting any limitation. Example embodiments of the present disclosure are equally applicable to any number of any units in time domain.

As also shown in FIG. 3, the OFDM symbols 302 and 304 are used for downlink control (DC) information 332 and 334. The OFDM symbols 306, 308, 310, 312, and 314 are used for downlink data (DD) 336, 338, 340, 342 and 115, in which it is assumed that the OFDM symbol 314 is used by the second device 120 to transmit the first transmission 115. The OFDM symbols 320, 322, 324, 326, and 328 are used for CG-PUSCH transmissions from a plurality of terminal devices including the first device 110 to the second device 120. In this example, the plurality of terminal devices may transmit CG-PUSCH data from the symbol 320 onwards. In other words, all the CG-PUSCH transmissions from the terminal devices can start at the point 384.

In addition, the plurality of terminal devices can be configured with different CP extension values to avoid collisions between the terminal devices. This means that the terminal devices can effectively starts their transmissions within the symbol 316 or the symbol 318. In some example embodiments, the CP extension can be transmitted immediately prior to the CG-PUSCH data. Although FIG. 3 depicts particular functions or purposes of the symbols 302 to 328, it is understood that this depiction is only for example without suggesting any limitation. In other example embodiments, each of the symbols 302 to 328 may have any other suitable function or purpose.

As further shown in FIG. 3, in the OFDM symbols 320, 322, 324, 326, and 328, the plurality of terminal devices including the first device 110 may be pre-allocated with time and frequency resources and can transmit uplink transmissions to the second device 120. As an example, the first device 110 may intend to transmit an uplink transmission 350 to the second device 120, and the uplink transmission 350 may include a CP extension and the second transmission 125. Similarly, other terminal devices may also intend to transmit their respective uplink transmissions 346, 348, 352, 354, and so on to the first device 110. Although in FIG. 3 the uplink transmissions 346, 348, 352, 354, and so on starting at different points are depicted as uplink transmissions from terminal devices other than the first device 110, it should be understood that in various situations the first device 110 may be configured to start the uplink transmission 350 at these points.

In some example embodiments, each of the uplink transmissions 346, 348, 350, 352 and so on may include a CP extension and a CG-PUSCH transmission. As described, the CG-PUSCH transmissions of the uplink transmissions 346, 348, 350, 352 and so on may all be configured to start at the end of the symbol 318, namely, the point 384. In contrast, the CP extensions of the uplink transmissions 346, 348, 350, 352 and so on are transmitted in the symbols 316 and 318 and may have different durations, so that the uplink transmissions from the plurality of terminal devices may be separated in time domain. For ease of discussion, the symbols 316 and 318 are enlarged in FIG. 3.

In the example of FIG. 3, if the uplink transmission 350 is started at the point 376, the duration of the CP extension of the uplink transmission 350 may be 72−34=38 μs. It should be noted that 72 μs here is an approximation of one symbol duration of a 15 kHz symbol. In other words, it is roughly but not exactly 72 μs. Actually, there are two values 71.87 μs and 71.34 μs. If the uplink transmission 346 is started at the point 372, the duration of the CP extension of the uplink transmission 346 may be 72−16=56 μs. If the uplink transmission 348 is started at the point 374, the duration of the CP extension of the uplink transmission 348 may be 72−25=47 μs. If an uplink transmission (not shown) is started at the point 378, the duration of the CP extension of the uplink transmission may be 72−43=29 μs. If an uplink transmission (not shown) is started at the point 380, the duration of the CP extension of the uplink transmission may be 72−52=20 μs. If the uplink transmission 352 is started at the point 382, the duration of the CP extension of the uplink transmission 352 may be 72−61=11 μs. For the uplink transmission 354, it does not have a CP extension prior to the CG-PUSCH transmission since the uplink transmission 354 starts at the point 384.

Figure 4:
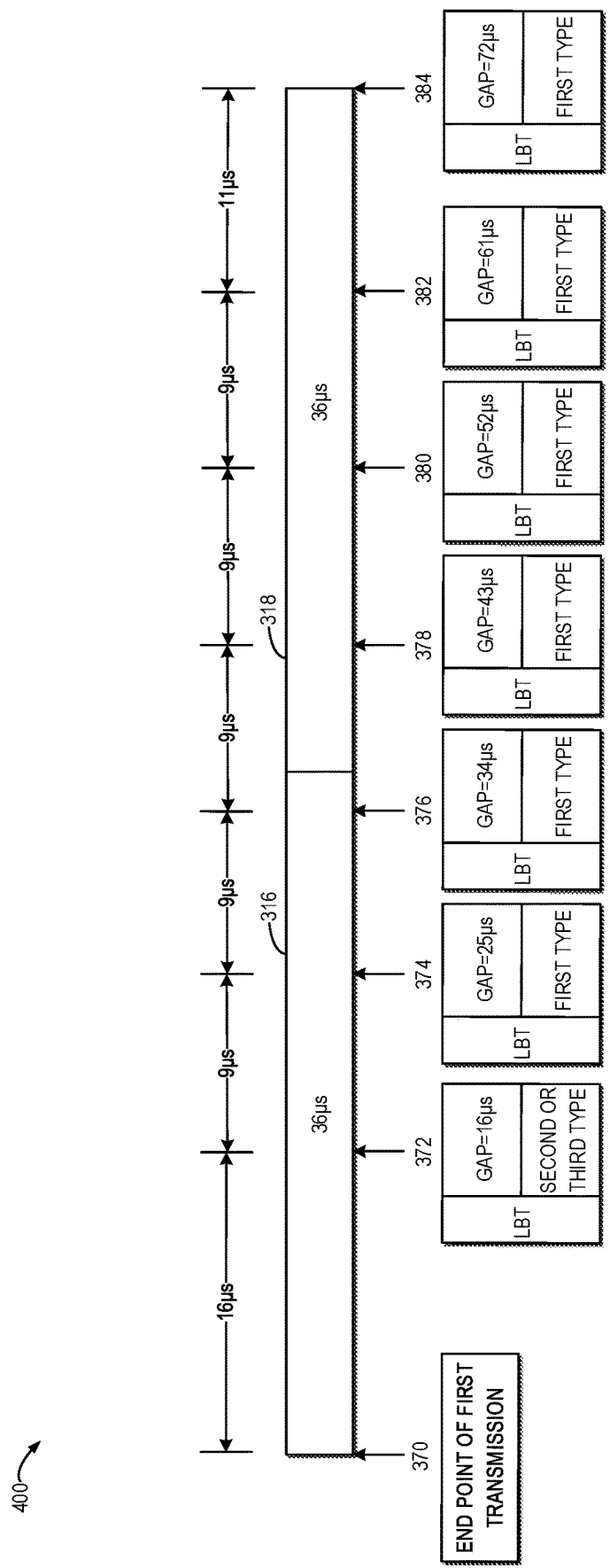
FIG. 4 illustrates an example scenario in which a first device determines a gap between an end point of a first transmission by a second device and a start point of a CP extension prior to a second transmission to the second device and performs an operation related to an LBT process for the second transmission, in accordance with some example embodiments of the present disclosure.

FIG. 4 illustrates an example scenario 400 in which the first device 110 determines the gap between the end point of the first transmission 115 by the second device 120 and the start point of the CP extension prior to the second transmission 125 to the second device 120 and performs an operation related to an LBT process for the second transmission 125, in accordance with some example embodiments of the present disclosure. Although FIG. 4 shows particular start points of the CP extension prior to the second transmission 125, it is understood that this depiction is only for example without suggesting any limitation. In other example embodiments, the start point of the CP extension may be any suitable time point before the second transmission 125.

As shown in FIG. 4, it is assumed that the second device 120 ends the first transmission 115 at the end point 370 of the symbol 314, and thus the point 370 may be determined by the first device 110 as the end point of the first transmission 115. For ease of discussion, the point 370 can be taken as a reference time point (denoted as 0 µs) for determining the gap between the end point of the first transmission 115 and the start point of the CP extension of the second transmission 125.

Accordingly, if the first device 110 determines that the start point of the CP extension prior to the second transmission 125 is the point 376, then the gap is 34 µs. Analogously, if the first device 110 determines that the start point of the CP extension is the point 372, the point 374, the point 378, the point 380, the point 382 or the point 384, then the gap is 16 µs, 25 µs, 43 µs, 52 µs, 61 µs, or 72 µs, respectively. It is noted that the duration of 72 µs may correspond to 1 OFDM symbol for subcarrier spacing of 15 kHz (72 µs). Also, it is noted that the timing advance is not considered here or assumed to be 0, and the subcarrier spacing is 30 kHz in this example. Example embodiments in which the timing advance is taken into account are further described later with reference to FIG. 7.

Figure 5:
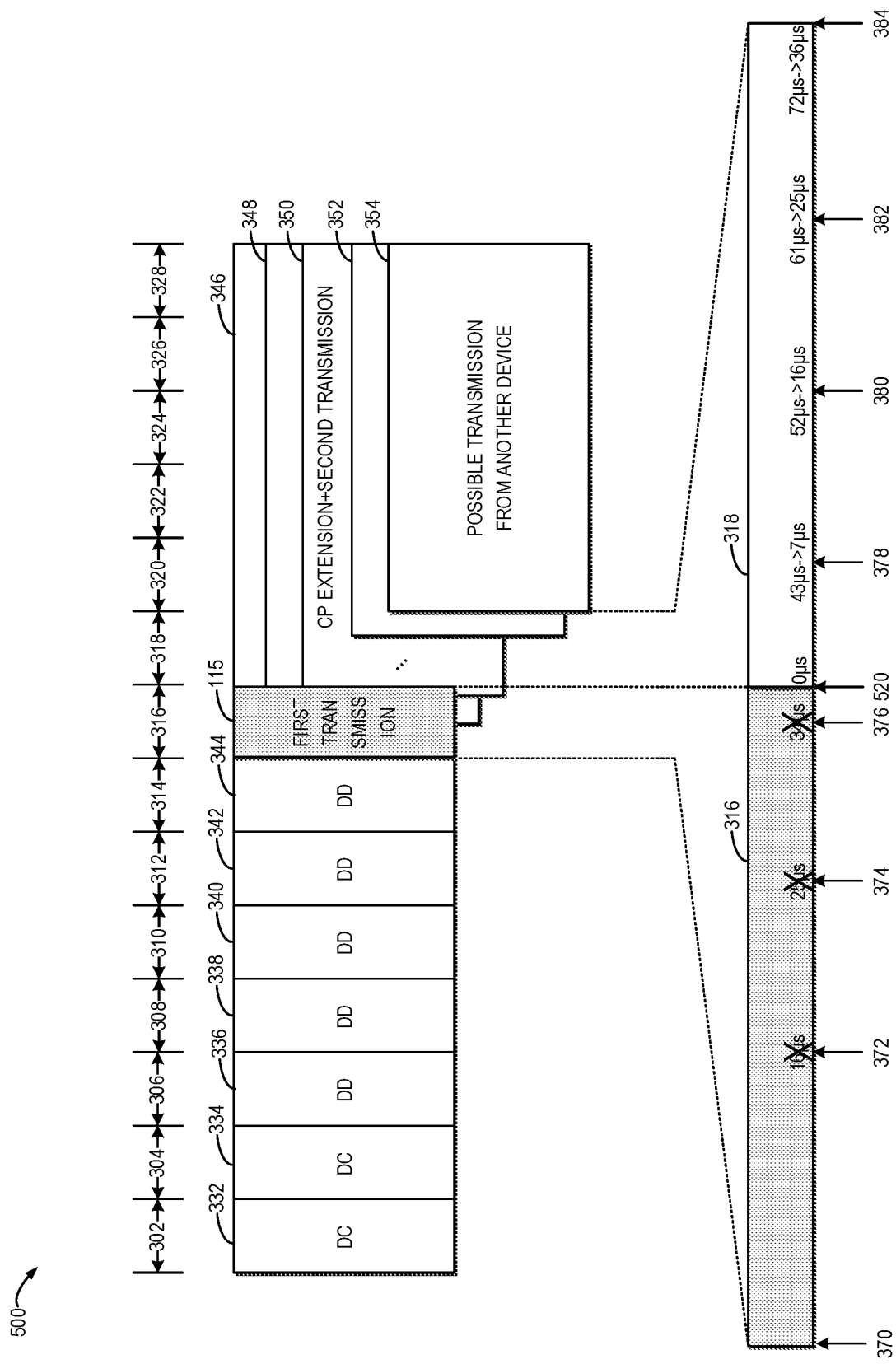
FIG. 5 illustrates another example scenario which shows some example start points for a first device to transmit a CP extension before a second transmission to a second device after a first transmission by the second device, in accordance with some example embodiments of the present disclosure.

FIG. 5 illustrates another example scenario 500 which shows some example start points 372, 374, 376, 378, 380, 382 and 384 for the first device 110 to transmit the CP extension before the second transmission 125 to the second device 120 after the first transmission 115 by the second device 120, in accordance with some example embodiments of the present disclosure. Although FIG. 5 shows particular start points of the CP extension prior to the second transmission 125, it is understood that this depiction is only for example without suggesting any limitation. In other example embodiments, the start point of the CP extension may be any suitable time point before the second transmission 125.

As shown in FIG. 5, according to a pre-determined configuration, the second device 120 may need to stop DL transmissions (DD) after symbol 314. However, the gNB may override this pre-determined allocation to use the resources in symbol 316 and later for other purpose, for example, for a URLLC DL transmission. In this example, the second device 120 can transmit an additional one-symbol DL transmission in symbol 316. Such overriding by the second device 120 can be signaled to or be detected by the first device 110, which can then determine the transmission in the symbol 316, instead of the DL transmission in the symbol 344, as the first transmission 115. In other words, in the scenario of FIG. 5, the OFDM symbols 306, 308, 310, 312, 314, and 316 are used for downlink data (DD) 336, 338, 340, 342, 344 and 115, in which it is assumed that the OFDM symbol 316 is used by the second device 120 to transmit the first transmission 115.

Figure 6:
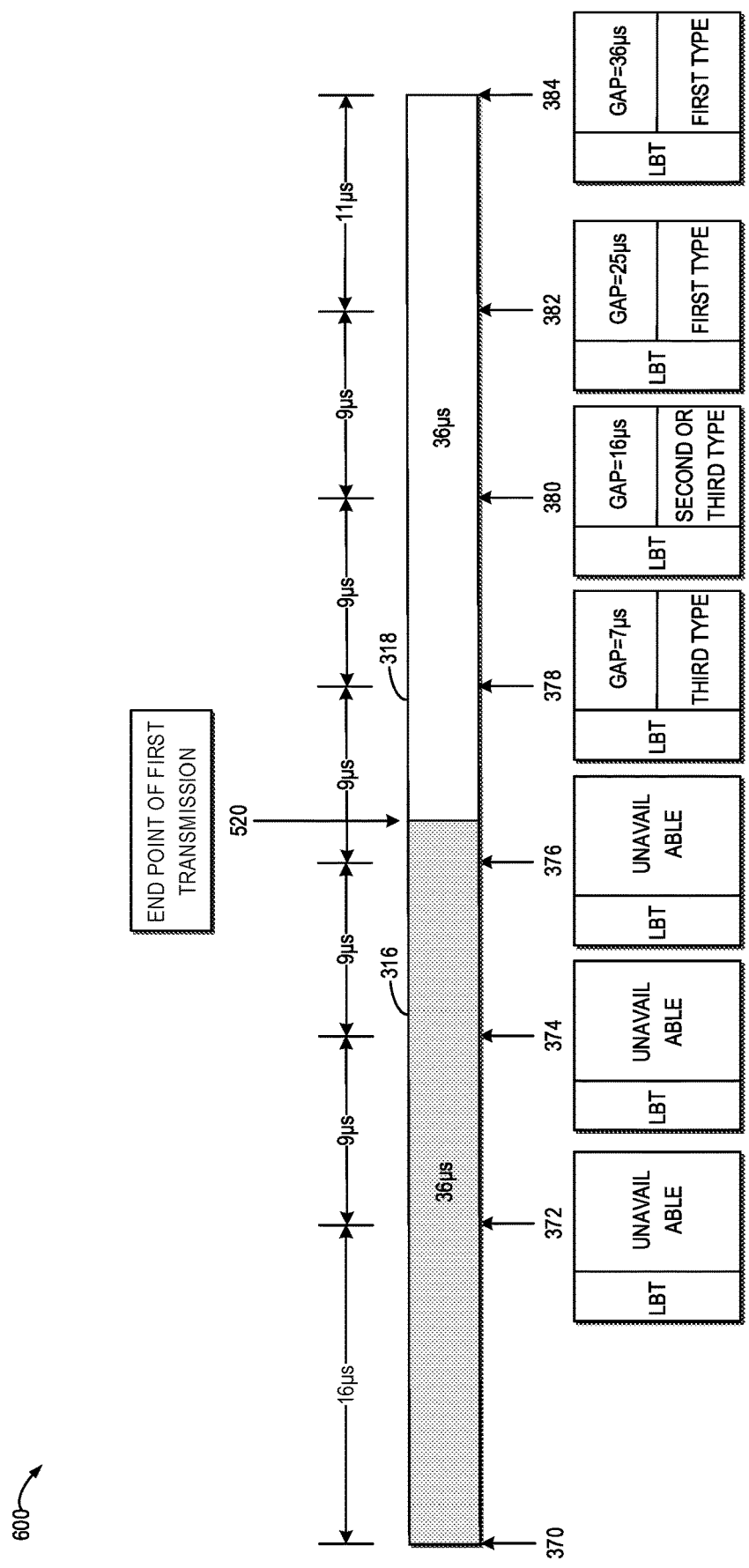
FIG. 6 illustrates another example scenario in which a first device determines a gap between an end point of a first transmission by a second device and a start point of a CP extension prior to a second transmission to the second device and performs an operation related to an LBT process for the second transmission, in accordance with some example embodiments of the present disclosure.

FIG. 6 illustrates another example scenario 600 in which the first device 110 determines the gap between the end point of the first transmission 115 by the second device 120 and the start point of the CP extension prior to the second transmission 125 to the second device 120 and performs an operation related to an LBT process for the second transmission 125, in accordance with some example embodiments of the present disclosure. Although FIG. 6 shows particular start points of the CP extension prior to the second transmission 125, it is understood that this depiction is only for example without suggesting any limitation. In other example embodiments, the start point of the CP extension may be any suitable time point before the second transmission 125.

As shown in FIG. 6, the first device 110 can determine the end point of the first transmission 115 from the second device 120 as the end of symbol 316, namely, the point 520. Therefore, if the first device 110 determines that the start point of the CP extension prior to the second transmission 125 is the point 378, then the gap is 7 µs. Analogously, if the first device 110 determines that the start point of the CP extension is the point 380, the point 382 or the point 384, then the gap is 16 µs, 25 µs or 36 µs, respectively. In some example embodiments, if the first device 110 determines that the start point of the CP extension prior to the second transmission 125 is the point 372, 374 or 376, since the first transmission 115 overlaps with these possible start points of the CP extension, the first device 110 may determine that the gap is a negative value (or unavailable), which means that there is no gap between the end point of the first transmission 115 and the start point of the CP extension before the second transmission 125 for the first device 110 to perform an LBT operation before transmitting the transmission of the CP extension and the second transmission 125.

In some example embodiments, when calculating the duration of the gap between the end of the latest DL transmission (before the intended CG-PUSCH transmission) by the second device 120 and the start of the CP extension prior to the intended CG-PUSCH transmission, the UE may also takes into account the timing advance it applies to uplink transmissions. More specifically, the TA may shorten the gap between the end point of the first transmission 115 and the start point of the CP extension. In this way, the impact of the timing advance on the operation related to a LBT process for the second transmission 125 can be minimized or even eliminated, thereby rendering the example embodiments of the present disclosure applicable to scenarios in which a timing advance is applied for the second transmission 125. Such an example is described below with reference to FIG. 7.

Figure 7:
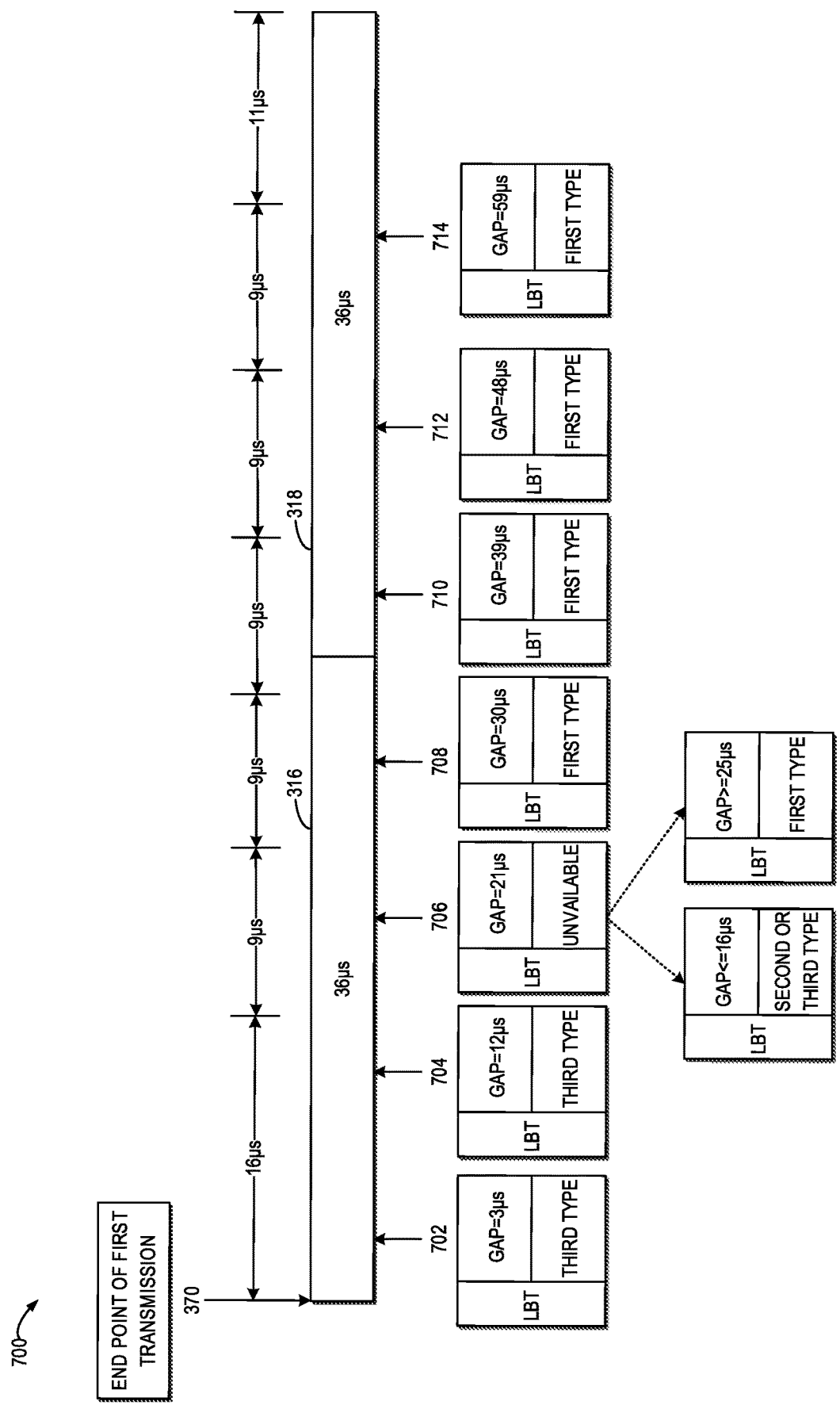
FIG. 7 illustrates a further example scenario in which a first device determines a gap between an end point of a first transmission by a second device and a start point of a CP extension prior to a second transmission to the second device and performs an operation related to an LBT process for the second transmission, in accordance with some example embodiments of the present disclosure.

FIG. 7 illustrates a further example scenario 700 in which the first device 110 determines the gap between the end point of the first transmission 115 by the second device 120 and the start point of the CP extension prior to the second transmission 125 to the second device 120 and performs an operation related to an LBT process for the second transmission 125, in accordance with some example embodiments of the present disclosure. Although FIG. 7 shows particular start points of the CP extension prior to the second transmission 125, it is understood that this depiction is only for example without suggesting any limitation. In other example embodiments, the start point of the CP extension may be any suitable time point before the second transmission 125.

As can be seen, FIG. 7 depicts an example similar to the example of FIG. 3, except that a TA of 13 µs is applied in FIG. 7. Correspondingly, the gaps between the end point 370 of the first transmission 115 and the start point of the CP extension are shortened by 13 µs. It is understood that the particular value of the TA is only for example without suggesting any limitation. In other example embodiments, the TA may be any other suitable values.

More particularly, in determining the duration of the gap with the applied TA, the first device 110 may determine a timing advance value for the second transmission 125. For example, in the example of FIG. 7, the first device 110 may determine a timing advance value of 13 µs. In some example embodiments, the timing advance value can be configured by the second device 120 via a configuration message.

Then, the first device 110 may determine the start point of the CP extension based on the timing advance value. For example, in the example of FIG. 7, if the timing advance value is zero (0), namely, without taking the timing advance value into account, the first device 110 may determine an initial start point as the points 372, 374, 376, 378, 380, 382 or 384 as shown in FIG. 3. Then, based on the timing advance value of 13 µs, the first device 110 may determine the start point of the CP extension as 702, 704, 706, 708, 710, 712 or 714 by advancing the initial start point by the timing advance value 13 µs.

Afterwards, the first device 110 may determine the duration of the gap based on the end point of the first transmission 115 and the start point of the CP extension which is determined based on the timing advance value. For example, in the example of FIG. 7, if the first device 110 determines that the start point of the CP extension prior to the second transmission 125 is the point 702, then the gap is 3 µs. Analogously, if the first device 110 determines that the start point of the CP extension is the point 704, the point 706, the point 708, the point 710, the point 712 or the point 714, then the gap is 12 µs, 21 µs, 30 µs, 39 µs, 48 µs, or 59 µs, respectively.

Referring back to FIG. 2, after determining the duration of the gap, at block 220, the first device 110 may perform an operation related to an LBT process for the second transmission 125 based on comparisons between the duration of the gap and a plurality of threshold durations associated with a plurality of types of LBT processes. In other words, there may be the plurality of types of LBT processes available for the first device 110 to perform channel sensing or an LBT operation on common transmission resources before transmitting a transmission to the second device 120, so as to determine whether the common transmission resources are occupied or not.

As described, NR-U may support several LBT types (for example, UL LBT types) as follows. Type 1 LBT may refer to the Cat4 LBT with exponential backoff, Type 2A LBT may refer to the Cat2 single shot LBT (25 µs measurement duration), Type 2B LBT may refer to the Cat2 single shot LBT (16 µs measurement duration), and Type 2C LBT may refer to the Cat1 LBT, namely, transmissions without channel sensing.

Accordingly, in the example embodiments in which the communication network 100 employ NR-U, a first LBT type of the plurality of LBT types can be the Type 2A LBT process, a second LBT type of the plurality of LBT types can be the Type 2B LBT process, and a third LBT type of the plurality of LBT types can be the Type 2C LBT process. In such example embodiments, a first threshold duration of the plurality of threshold durations can be 25 µs, and a second threshold duration of the plurality of threshold durations can be 16 µs. It should be understood that the particular number of LBT types and the particular threshold durations are only for example without suggesting any limitation. In other example embodiments, there may be any number of LBT types associated with any threshold durations.

In some example embodiments, the Type 2A or 2B or 2C LBTs can be applied with some restrictions. For example, the restriction on the Type 2A LBT may be that the gap between the downlink (DL) transmission and the following UL transmission (or between two consecutive UL transmissions) is at least 25 µs. The restriction on the Type 2B LBT may be that the gap between the DL transmission and the following UL transmission is 16 µs. The restriction on the Type 2C LBT may be that the gap between the DL transmission and the following UL transmission is up to 16 µs, and the duration of the UL transmission is no more than 0.584 ms.

Since the plurality of LBT types are associated with the plurality of threshold durations, meaning that the plurality of LBT types can be distinguished through the threshold durations, the first device 110 can compare the gap with the plurality of threshold durations. Based on the results of the comparisons between the gap and a plurality of threshold durations, the first device 110 can determine an appropriate operation related to an LBT process for the second transmission 125, for example, based on the restrictions on the plurality of LBT types. Then, the first device 110 may perform the appropriate operation before transmitting the transmission of the CP extension and the second transmission 125.

For example, based on the results of the comparisons and optionally the restrictions on the plurality of LBT types, the first device 110 may identify that an LBT process of a particular type is suitable for the determined gap, and thus the first device 110 can perform an LBT operation of the particular type during the gap before transmitting the CP extension. As another example, based on the results of the comparisons and optionally the restrictions on the plurality of LBT types, the first device 110 may find that none of the plurality types of LBT processes is suitable for the gap. In such a situation, the first device 110 may extend or shorten the gap by adjusting the start point of the CP extension, such that the gap is adjusted to be suitable for performing an LBT process of a particular type. Then, the first device 110 can perform an LBT operation of the particular type during the adjusted gap before transmitting the transmission of the CP extension and the second transmission 125. Alternatively, in case none of the plurality types of LBT processes is suitable for the gap, the first device 110 can drop an LBT operation for the second transmission 125 and also drop the second transmission 125.

In the following, without loss of generality, some specific examples will be described with reference to FIGS. 3-7 under the assumption that there are three LBT types and two threshold durations. In particular, the first type of LBT process is associated with a channel sensing for the first threshold duration, the second type of LBT process is associated with a channel sensing for the second threshold duration shorter than the first threshold duration, and the third type of LBT process is not associated with a channel sensing. In some example embodiments, the first threshold duration and the second threshold duration can be 25 µs and 16 µs, respectively. In some other example embodiments, the first threshold duration and the second threshold duration can be any other suitable time lengths.

In some scenarios, the first device 110 may determine that the gap is shorter than both the first threshold duration and the second threshold duration which is shorter than the first threshold duration. For example, with reference to FIGS. 5 and 6, it is assumed that the first device 110 determines the end point of the first transmission 115 as the point 520, and determines the start point of the CP extension as the point 378. In such cases, as further shown in FIG. 6, the first device 110 can determine the gap as (43−36)=7 µs, which is shorter than the first threshold duration 25 µs and the second threshold duration 16 µs.

Further with reference to FIGS. 5 and 6, it is assumed that the first device 110 determines the end point of the first transmission 115 as the point 520, and determines the start point of the CP extension as the point 372, 374 or 376. In such cases, the first device 110 can determine the gap as a negative value (or unavailable), which can also be regarded as shorter than the first threshold duration 25 µs and the second threshold duration 16 µs, in some example embodiments.

As another example, with reference to FIG. 7, it is assumed that the first device 110 determines the end point of the first transmission 115 as the point 370, and determines the start point of the CP extension as the point 702. In such cases, the first device 110 can determine the gap as (3−0)=3

µs, which is shorter than the first threshold duration 25 µs and the second threshold duration 16 µs.

Further with reference to FIG. 7, it is assumed that the first device 110 determines the end point of the first transmission 115 as the point 370, and determines the start point of the CP extension as the point 704. In such cases, the first device 110 can determine the gap as (12−0)=12 µs, which is shorter than the first threshold duration 25 µs and the second threshold duration 16 µs.

If the first device 110 determines that the duration of the gap is shorter than the first threshold duration and also shorter than the second threshold duration, the first device 110 can perform an LBT operation of a suitable type or alternatively drop an LBT operation for the second transmission 120 and also drop the second transmission 125. In this way, the first device 110 can select a suitable LBT type of the LBT operation for the second transmission 125 or drop the second transmission 125 in the event that the gap for the LBT operation is short. In some situations, the first device 110 can perform an LBT operation for the second transmission 125 after an adjustment to the CP extension before the second transmission 125 even if there is no gap or the gap is initially inappropriate for performing an LBT operation. Therefore, the likelihood of the success of LBT processes can be improved or even maximized.

For instance, in case that the duration of the gap is shorter than the first threshold duration and also shorter than (or equal to) the second threshold duration, the first device 110 can perform an LBT operation of the third type without a channel sensing. More particularly, if the duration of the second transmission 125 is within a predetermined duration, the first device 110 may perform the LBT operation of the third type. In this way, the first device 110 can perform an LBT operation without any adjustment to the CP extension before the second transmission 125, thereby causing the least impact on the CP extension and the second transmission 125 and also simplifying the operations of the first device 110.

More particularly, for the example embodiments in which the second transmission 125 is a CG-PUSCH transmission, the predetermined duration may be 584 µs. Thus, in case that the start point for the CP extension is less than or equal to 16 µs after an indicated DL symbol (that is, the DL-UL gap is less than or equal to 16 µs) and the duration of the CG-PUSCH transmission does not exceed 584 µs, the first device 110 may transmit a CG-PUSCH transmission after performing a Cat1 LBT (namely, a Type 2C UL channel access procedure). It is understood that the particular value of the predetermined duration is only for example without suggesting any limitation. In other example embodiments, the predetermined duration may be any other suitable values.

As an example of performing an LBT operation of the third type, with reference to FIGS. 5 and 6, it is assumed that the first device 110 determines the start point of the CP extension as the point 378 and thus the gap is 7 µs. In this event, if the first device 110 determines that the duration of the second transmission 125 is within the predetermined duration (for example, 584 µs), then the first device 110 may perform the LBT operation of the third type.

Similarly, with reference to FIG. 7, it is assumed that the first device 110 determines the start point of the CP extension as the point 702 or 704 and thus the gap is 3 µs or 12 µs. In this event, if the first device 110 determines that the duration of the second transmission 125 is within the predetermined duration (for example, 584 µs), then the first device 110 may perform the LBT operation of the third type.

Alternatively, in case that the duration of the gap is shorter than the first threshold duration and also shorter than the second threshold duration, the first device 110 can perform an LBT operation of the second type with a channel sensing for the second threshold duration. For instance, if the duration of the second transmission 125 exceeds the predetermined duration, the first device 110 may determine an adjusted start point of the CP extension later than the initial start point by shortening the CP extension, such that the duration of the gap is extended to the second threshold duration. Then, the first device 110 may perform the LBT operation of the second type. As such, the first device 110 can perform an LBT operation for the second transmission 125 after an adjustment to the CP extension before the second transmission 125 even if the gap is initially inappropriate for performing an LBT operation. Therefore, the likelihood of the success of LBT processes can be improved or even maximized.

More particularly, for the example embodiments in which the second transmission 125 is a CG-PUSCH transmission, if the start point for the CP extension is less than or equal to 16 µs after an indicated DL symbol (that is, the DL-UL gap is less than 16 µs) and the duration of the CG-PUSCH transmission exceeds 584 µs, the first device 110 may reduce the length of the CP extension by X µs (and consequently enlarge the DL-UL gap) and apply 16 µs Cat2 LBT (that is, a Type 2B or 2A UL channel access procedure), where X=16 µs−gap.

For example, with reference to FIGS. 5 and 6, it is assumed that the first device 110 determines the start point of the CP extension as the point 378 and thus the gap is 7 µs. In this event, if the first device 110 determines that the duration of the second transmission 125 is longer than the predetermined duration (for example, 584 µs), then the first device 110 may shorten the CP extension by X=16−7=9 µs. Accordingly, the first device 110 can determine an adjusted start point of the CP extension as 16 µs (assuming the reference point 520=0 µs), such that the duration of the gap is extended to 16 µs. Then, the first device 110 may perform the LBT operation of the second type.

In addition, with reference to FIGS. 5 and 6, it is assumed that the first device 110 determines the start point of the CP extension as the point 372, 374 or 376 and thus the gap is a negative value (or unavailable). In this event, for the point 372, 374 or 376, the first device 110 may shorten the CP extension by X=16−(−20)=36 µs, X=16−(−11)=27 µs, or X=16−(−2)=18 µs, respectively. Accordingly, the first device 110 can determine an adjusted start point of the CP extension as 16 µs (assuming the reference point 520=0 µs), such that the duration of the gap is extended to 16 µs. Then, the first device 110 may perform the LBT operation of the second type.

Similarly, with reference to FIG. 7, it is assumed that the first device 110 determines the start point of the CP extension as the point 702 or 704 and thus the gap is 3 µs or 12 µs. In this event, if the first device 110 determines that the duration of the second transmission 125 is longer than the predetermined duration (for example, 584 µs), then the first device 110 may shorten the CP extension by X=16−3=13 µs or X=16−12=4 µs. Accordingly, the first device 110 can determine an adjusted start point of the CP extension as 16 µs (assuming the reference point 520=0 µs), such that the duration of the gap is extended to 16 µs. Then, the first device 110 may perform the LBT operation of the second type.

Alternatively, in case that the duration of the gap is shorter than the first threshold duration and also shorter than the second threshold duration, the first device 110 can perform an LBT operation of a first type with a channel sensing for the first threshold duration. For instance, if the duration of the second transmission 125 exceeds a predetermined duration, the first device 110 may determine an adjusted start point of the CP extension later than the initial start point by shortening the CP extension, such that the duration of the gap is extended to the first threshold duration. Then, the first device 110 may perform the LBT operation of the first type. In some other example embodiments, the duration of the gap may be extended to be greater than the first threshold duration by shortening the CP extension. As such, the first device 110 can perform an LBT operation for the second transmission 125 after an adjustment to the CP extension before the second transmission 125 even if the gap is initially inappropriate for performing an LBT operation. Therefore, the likelihood of the success of LBT processes can be improved or even maximized.

More particularly, for the example embodiments in which the second transmission 125 is a CG-PUSCH transmission, if the start point for the CP extension is less than or equal to 16 µs after an indicated DL symbol (that is, the DL-UL gap is less than 16 µs) and the duration of the CG-PUSCH transmission exceeds 584 µs, the first device 110 may reduce the length of the CP extension by Y µs (and consequently enlarge the DL-UL gap) and apply a 25 µs Cat2 LBT (that is, a Type 2B or 2A UL channel access procedure), where Y=25 µs–gap.

For example, with reference to FIGS. 5 and 6, it is assumed that the first device 110 determines the start point of the CP extension as the point 378 and thus the gap is 7 µs. In this event, if the first device 110 determines that the duration of the second transmission 125 is longer than the predetermined duration (for example, 584 µs), then the first device 110 may shorten the CP extension by Y=25−7=18 µs. Accordingly, the first device 110 can determine an adjusted start point of the CP extension as 25 µs (assuming the reference point 520=0 µs), such that the duration of the gap is extended to 25 µs. Then, the first device 110 may perform the LBT operation of the first type.

In addition, with reference to FIGS. 5 and 6, it is assumed that the first device 110 determines the start point of the CP extension as the point 372, 374 or 376 and thus the gap is a negative value (or unavailable). In this event, the first device 110 may shorten the CP extension by Y=25−(−20)=45 µs, Y=25−(−11)=36 µs, or Y=25−(−2)=27 µs. Accordingly, the first device 110 can determine an adjusted start point of the CP extension as 25 µs (assuming the reference point 520=0 µs), such that the duration of the gap is extended to 25 µs. Then, the first device 110 may perform the LBT operation of the first type.

Similarly, with reference to FIG. 7, it is assumed that the first device 110 determines the start point of the CP extension as the point 702 or 704 and thus the gap is 3 µs or 12 µs. In this event, if the first device 110 determines that the duration of the second transmission 125 is longer than the predetermined duration (for example, 584 µs), then the first device 110 may shorten the CP extension by Y=25−3=22 µs or Y=25−12=13 µs. Accordingly, the first device 110 can determine an adjusted start point of the CP extension as 25 µs (assuming the reference point 520=0 µs), such that the duration of the gap is extended to 25 µs. Then, the first device 110 may perform the LBT operation of the first type.

Alternatively, in case that the duration of the gap is shorter than the first threshold duration and also shorter than the second threshold duration, the first device 110 can drop an LBT operation for the second transmission 125 and also drop the second transmission 125. For instance, if the duration of the second transmission 125 exceeds a predetermined duration, the first device 110 may drop the LBT operation for the second transmission 125 and the second transmission 125. In this way, the first device 110 can ensure that the second transmission 125 is not to collide with other potential transmissions from other terminal devices and also simplify the operations of the first device 110.

More particularly, for the example embodiments in which the second transmission 125 is a CG-PUSCH transmission, if the start point for the CP extension is less than or equal to 16 µs after an indicated DL symbol (that is, the DL-UL gap is less than 16 µs) and the duration of the CG-PUSCH transmission exceeds 584 µs, the first device 110 may drop the CG-PUSCH transmission.

For example, with reference to FIGS. 5 and 6, it is assumed that the first device 110 determines the start point of the CP extension as the point 378 and thus the gap is 7 µs. In this event, if the first device 110 determines that the duration of the second transmission 125 exceeds the predetermined duration (for example, 584 µs), then the first device 110 may drop the LBT operation for the second transmission 125 and the second transmission 125. In addition, it is assumed that the first device 110 determines the start point of the CP extension as the point 372, 374 or 376 and thus the gap is a negative value (or unavailable). In this event, the first device 110 may drop an LBT operation for the second transmission 125 and the second transmission 125.

Further, with reference to FIG. 7, it is assumed that the first device 110 determines the start point of the CP extension as the point 702 or 704 and thus the gap is 3 µs or 12 µs. In this event, if the first device 110 determines that the duration of the second transmission 125 exceeds the predetermined duration (for example, 584 µs), then the first device 110 may drop an LBT operation for the second transmission 125 and the second transmission 125.

In some scenarios, the first device 110 may determine that the gap is shorter than the first threshold duration and equal to the second threshold duration. For example, with reference to FIGS. 3 and 4, it is assumed that the first device 110 determines the end point of the first transmission 115 as the point 370, and determines the start point of the CP extension as the point 372. In such cases, as further shown in FIG. 4, the first device 110 can determine the gap as (16−0)=16 µs, which is shorter than the first threshold duration 25 µs and equal to the second threshold duration 16 µs.

As another example, with reference to FIGS. 5 and 6, it is assumed that the first device 110 determines the end point of the first transmission 115 as the point 520, and determines the start point of the CP extension as the point 380. In such cases, as further shown in FIG. 6, the first device 110 can determine the gap as (16−0)=16 µs, which is shorter than the first threshold duration 25 µs and equal to the second threshold duration 16 µs.

If the first device 110 determines that the duration of the gap is equal to the second threshold duration which is shorter than the first threshold duration, the first device 110 can perform an LBT operation of the second type with a channel sensing for the second threshold duration. In this way, the first device 110 can perform an LBT operation without any adjustment to the CP extension before the second transmission 125, thereby causing the least impact on the CP extension and the second transmission 125 and also simplifying the operations of the first device 110.

More particularly, for the example embodiments in which the second transmission 125 is a CG-PUSCH transmission, if the start point for the CP extension is 16 µs after an indicated DL symbol (that is, the gap is equal to 16 µs), the first device 110 may apply a 16 µs Cat2 LBT (that is, a Type 2B UL channel access procedure).

For example, with reference to FIGS. 3 and 4, it is assumed that the first device 110 determines the start point of the CP extension as the point 372 and thus the gap is 16 µs. In this event, the first device 110 may perform the LBT operation of the second type. Similarly, with reference to FIGS. 5 and 6, it is assumed that the first device 110 determines the start point of the CP extension as the point 380 and thus the gap is 16 µs. In this event, the first device 110 may perform the LBT operation of the second type.

In some scenarios, the first device 110 may determine that the gap is shorter than the first threshold duration and longer than the second threshold duration. For example, with reference to FIG. 7, it is assumed that the first device 110 determines the end point of the first transmission 115 as the point 370, and determines the start point of the CP extension as the point 706. In such cases, as further shown in FIG. 7, the first device 110 can determine the gap as (21−0)=21 µs, which is shorter than the first threshold duration 25 µs and longer than the second threshold duration 16 µs.

If the first device 110 determines that the duration of the gap is shorter than the first threshold duration and longer than the second threshold duration, the first device 110 can perform an LBT operation of a suitable type or alternatively drop an LBT operation for the second transmission 120 and the second transmission 125. In this way, the first device 110 can select a suitable LBT type of the LBT operation for the second transmission 125 or drop the second transmission 125 in the event that the gap for the LBT operation is inappropriate for performing any type of LBT operations. In some situations, the first device 110 can perform an LBT operation for the second transmission 125 after an adjustment to the CP extension before the second transmission 125 even if the gap is initially inappropriate for performing an LBT operation. Therefore, the likelihood of the success of LBT processes can be improved or even maximized.

For instance, in case that the duration of the gap is shorter than the first threshold duration and longer than the second threshold duration, the first device 110 can perform an LBT operation of a first type with a channel sensing for the first threshold duration. More particularly, the first device 110 may determine an adjusted start point of the CP extension later than the start point by shortening the CP extension, such that the duration of the gap is extended to the first threshold duration. The reason may be that an LBT operation of the first type or the second type may be not allowed to be performed in a gap between 16 µs and 25 µs. Then, the first device 110 may perform an LBT operation of a first type with a channel sensing for the first threshold duration. In some example embodiments, the duration of the gap may be extended to be longer than the first threshold duration. As such, the first device 110 can perform an LBT operation for the second transmission 125 after an adjustment to the CP extension before the second transmission 125 even if the gap is initially inappropriate for performing an LBT operation. Therefore, the likelihood of the success of LBT processes can be improved or even maximized.

More particularly, for the example embodiments in which the second transmission 125 is a CG-PUSCH transmission, if the start point for the CP extension is more than 16 µs and less than 25 µs after an indicated DL symbol, the first device 110 may reduce the length of the CP extension (and consequently extend the DL-UL gap) by X µs and apply a 25 µs Cat2 LBT (that is, a Type 2A UL channel access procedure), where X=25 µs−gap.

For example, with reference to FIG. 7, it is assumed that the first device 110 determines the start point of the CP extension as the point 706 and thus the gap is 21 µs. In this event, the first device 110 may shorten the CP extension by X=25−21=4 µs. Accordingly, the first device 110 can determine an adjusted start point of the CP extension as 25 µs (assuming the reference point 370=0 µs), such that the duration of the gap is extended to 25 µs. Then, the first device 110 may perform the LBT operation of the first type. In some example embodiments, the duration of the gap may be extended to be longer than 25 µs.

Alternatively, in case that the duration of the gap is shorter than the first threshold duration and longer than the second threshold duration, the first device 110 can perform an LBT operation of a second type with a channel sensing for the second threshold duration. For instance, the first device 110 may determine an adjusted start point of the CP extension earlier than the start point by extending the CP extension, such that the duration of the gap is shortened to the second threshold duration. Then, the first device 110 may perform an LBT operation of a second type with a channel sensing for the second threshold duration. As such, the first device 110 can perform an LBT operation for the second transmission 125 after an adjustment to the CP extension before the second transmission 125 even if the gap is initially inappropriate for performing an LBT operation. Therefore, the likelihood of the success of LBT processes can be improved or even maximized.

More particularly, for the example embodiments in which the second transmission 125 is a CG-PUSCH transmission, if the start point for the CP extension is more than 16 µs and less than 25 µs after an indicated DL symbol, the first device 110 may extend the length of the CP extension (and consequently shorten the DL-UL gap) by Y µs and apply a Type 2B UL channel access procedure, depending on the duration of the CG-PUSCH transmission, where Y=gap−16 µs.

For example, with reference to FIG. 7, it is assumed that the first device 110 determines the start point of the CP extension as the point 706 and thus the gap is 21 µs. In this event, the first device 110 may extend the CP extension by Y=21−16=5 µs. Accordingly, the first device 110 can determine an adjusted start point of the CP extension as 16 µs (assuming the reference point 370=0 µs), such that the duration of the gap is shortened to 16 µs. Then, the first device 110 may perform the LBT operation of the second type.

Alternatively, in case that the duration of the gap is shorter than the first threshold duration and longer than the second threshold duration, the first device 110 can perform an LBT operation of a third type without a channel sensing. For instance, the first device 110 may determine an adjusted start point of the CP extension earlier than the start point by extending the CP extension, such that the duration of the gap is shortened to be shorter than the second threshold duration. Then, the first device 110 may perform an LBT operation of a third type without a channel sensing. As such, the first device 110 can perform an LBT operation for the second transmission 125 after an adjustment to the CP extension before the second transmission 125 even if the gap is initially inappropriate for performing an LBT operation. Therefore, the likelihood of the success of LBT processes can be improved or even maximized.

More particularly, for the example embodiments in which the second transmission 125 is a CG-PUSCH transmission, if the start point for the CP extension is more than 16 µs and less than 25 µs after an indicated DL symbol, the first device 110 may extend the length of the CP extension (and consequently shorten the DL-UL gap) by a value greater than Y µs and apply a Type 2C UL channel access procedure, depending on the duration of the CG-PUSCH transmission, where Y=gap−16 µs.

For example, with reference to FIG. 7, it is assumed that the first device 110 determines the start point of the CP extension as the point 706 and thus the gap is 21 µs. In this event, the first device 110 may extend the CP extension by a value greater than Y=21−16=5 µs. Accordingly, the first device 110 can determine an adjusted start point of the CP extension before the 16 µs (assuming the reference point 370=0 µs), such that the duration of the gap is shortened to be shorter than 16 µs. Then, the first device 110 may perform the LBT operation of the third type.

Alternatively, in case that the duration of the gap is shorter than the first threshold duration and longer than the second threshold duration, the first device 110 may drop an LBT operation for the second transmission 125 and the second transmission 125. In this way, the first device 110 can ensure that the second transmission 125 is not to collide with other potential transmissions from other terminal devices and also simplify the operations of the first device 110.

More particularly, for the example embodiments in which the second transmission 125 is a CG-PUSCH transmission, if the start point for the CP extension is more than 16 µs and less than 25 µs after an indicated DL symbol, the first device 110 may drop the CG-PUSCH.

For example, with reference to FIG. 7, it is assumed that the first device 110 determines the start point of the CP extension as the point 706 and thus the gap is 21 µs. In this event, the first device 110 may drop an LBT operation for the second transmission 125 and also drop the second transmission 125.

In some scenarios, the first device 110 may determine that the gap is longer than the second threshold duration and longer than or equal to the first threshold duration. For example, with reference to FIGS. 3 and 4, it is assumed that the first device 110 determines the end point of the first transmission 115 as the point 370, and determines the start point of the CP extension as the point 374, 376, 378, 380, 382 or 384. In such cases, as further shown in FIG. 4, the first device 110 can determine the gap as 25 µs, 34 µs, 43 µs, 52 µs, 61 µs or 72 µs, respectively, which are longer than the second threshold duration 16 µs and longer than or equal to the first threshold duration 25 µs.

As another example, with reference to FIGS. 5 and 6, it is assumed that the first device 110 determines the end point of the first transmission 115 as the point 520, and determines the start point of the CP extension as the point 382 or 384. In such cases, as further shown in FIG. 6, the first device 110 can determine the gap as 25 µs or 36 µs, respectively, which are longer than the second threshold duration 16 µs and longer than or equal to the first threshold duration 25 µs.

As a further example, with reference to FIG. 7, it is assumed that the first device 110 determines the end point of the first transmission 115 as the point 370, and determines the start point of the CP extension as the point 708, 710, 712 or 714. In such cases, the first device 110 can determine the gap as 30 µs, 39 µs, 48 µs or 59 µs, respectively, which are longer than the second threshold duration 16 µs and longer than or equal to the first threshold duration 25 µs.

If the first device 110 determines that the duration of the gap is longer than the second threshold duration and longer than or equal to the first threshold duration, the first device 110 can perform an LBT operation of a first type with a channel sensing for the first threshold duration. In this way, the first device 110 can perform an LBT operation without any adjustment to the CP extension before the second transmission 125, thereby causing the least impact on the CP extension and the second transmission 125 and also simplifying the operations of the first device 110.

More particularly, for the example embodiments in which the second transmission 125 is a CG-PUSCH transmission, if the start point for the CP extension is at least 25 µs after an indicated DL symbol, the first device 110 may apply a 25 µs Cat2 LBT (that is, a Type 2A UL channel access procedure).

For example, with reference to FIGS. 3 and 4, it is assumed that the first device 110 determines the start point of the CP extension as the point 374, 376, 378, 380, 382 or 384 and thus the gap is 25 µs, 34 µs, 43 µs, 52 µs, 61 µs or 72 µs. In this event, the first device 110 may perform the LBT operation of the first type. Similarly, with reference to FIGS. 5 and 6, it is assumed that the first device 110 determines the start point of the CP extension as the point 382 or 384 and thus the gap is 25 µs or 36 µs. In this event, the first device 110 may perform the LBT operation of the first type. Analogously, with reference to FIG. 7, it is assumed that the first device 110 determines the start point of the CP extension as the point 708, 710, 712 or 714 and thus the gap is 30 µs, 39 µs, 48 µs or 59 µs. In this event, the first device 110 may perform the LBT operation of the first type.

In some example embodiments, if the second transmission 125 (for example, the CG-PUSCH transmission) by the first device 110 does not fit into a configuration (for example, a COT) indicated by the second device 120, the first device 110 may apply the Cat4 LBT process (that is, the LBT of Type 1) for the second transmission 125. For instance, this may be the case that the available symbols indicated in the configuration from the second device 120 finish before the start point of the CP extension prior to the second transmission 125.

Embodiments of the present disclosure can solve various problems in the traditional solutions. In particular, as can be seen from FIGS. 5 and 6, embodiments of the present disclosure well solve the issue of gNB overriding as indicated in the foregoing part of the present disclosure. When this overriding happens in FIGS. 5 and 6, according to the traditional solutions, the second transmission (for example, UL CG transmissions) 125 using the pre-configured CP extension value and LBT type may not be feasible anymore.

Taking the start point 376 as an example, according to the traditional solutions, the first device 110 need to perform a 25 µs CCA and start to transmit CP extension 34 µs after the boundary between the symbol 314 and symbol 316. If the second device 120 uses the symbol 316 for a DL data transmission, the first device 110 is to detect the channel as busy, and is unable to start transmitting at the configured start point.

Taking the start point 378 as another example, after the overriding by the second device 120, the gap between the end of DL transmission and the starting position of pre-defined transmission (including the CP extension) is changed from 43 µs to 7 µs. Therefore, the first device 110 is not allowed to use the pre-defined Type 2A UL channel access for the CG-PUSCH transmission, since the Type 2A UL channel access type is only allowed if the gap is 25 µs or more.

In contrast, as described above, if the first device 110 determines the point 376 or 378 as the start point of the CP extension before the second transmission 125, then the first device 110 can adaptively change the duration of the CP extension to adjust the gap to be suitable for performing an LBT operation of a particular type. Therefore, compared to the traditional solutions, embodiments of the present disclosure can enable an LBT operation even if any LBT operation is not allowed according to the traditional solutions. Alternatively, in some events, the first device 110 can actively drop an LBT operation for the second transmission 125 and the second transmission 125, thereby avoiding useless channel sensing in the traditional solutions and saving power.

In some example embodiments, an apparatus capable of performing the method 200 (for example, the first device 110) may comprise means for performing the respective steps of the method 200. The means may be implemented in any suitable form. For example, the means may be implemented in a circuitry or software module.

In some example embodiments, the apparatus comprises means for determining a duration of a gap between an end point of a first transmission to be transmitted by a further apparatus and a start point of a CP extension prior to a second transmission to be transmitted by the apparatus; and means for performing an operation related to an LBT process for the second transmission based on comparisons between the duration of the gap and a plurality of threshold durations associated with a plurality of types of LBT processes.

In some example embodiments, the means for performing the operation comprises: in accordance with a determination that the duration of the gap is shorter than a first threshold duration and a second threshold duration which is shorter than the first threshold duration, means for performing the operation selected from a group consisting of the following: performing an LBT operation of a first type with a channel sensing for the first threshold duration, performing an LBT operation of a second type with a channel sensing for the second threshold duration, performing an LBT operation of a third type without a channel sensing, or dropping an LBT operation for the second transmission and the second transmission.

In some example embodiments, the apparatus further comprises: in accordance with a determination that a duration of the second transmission is within a predetermined duration, means for performing the LBT operation of the third type.

In some example embodiments, the apparatus further comprises: in accordance with a determination that a duration of the second transmission exceeds a predetermined duration, means for determining an adjusted start point of the cyclic prefix extension later than the start point by shortening the cyclic prefix extension, such that the duration of the gap is extended to the second threshold duration; and means for performing the LBT operation of the second type.

In some example embodiments, the apparatus further comprises: in accordance with a determination that a duration of the second transmission exceeds a predetermined duration, means for determining an adjusted start point of the cyclic prefix extension later than the start point by shortening the cyclic prefix extension, such that the duration of the gap is extended to the first threshold duration; and means for performing the LBT operation of the first type.

In some example embodiments, the apparatus further comprises: in accordance with a determination that a duration of the second transmission exceeds a predetermined duration, means for dropping the LBT operation for the second transmission and the second transmission.

In some example embodiments, the means for performing the operation comprises: in accordance with a determination that the duration of the gap is equal to a second threshold duration which is shorter than a first threshold duration, means for performing an LBT operation of a second type with a channel sensing for the second threshold duration.

In some example embodiments, the means for performing the operation comprises: in accordance with a determination that the duration of the gap is shorter than a first threshold duration and longer than a second threshold duration, means for determining an adjusted start point of the cyclic prefix extension later than the start point by shortening the cyclic prefix extension, such that the duration of the gap is extended to the first threshold duration; and means for performing an LBT operation of a first type with a channel sensing for the first threshold duration.

In some example embodiments, the means for performing the operation comprises: in accordance with a determination that the duration of the gap is shorter than a first threshold duration and longer than a second threshold duration, means for determining an adjusted start point of the cyclic prefix extension earlier than the start point by extending the cyclic prefix extension, such that the duration of the gap is shortened to the second threshold duration; and means for performing an LBT operation of a second type with a channel sensing for the second threshold duration.

In some example embodiments, the means for performing the operation comprises: in accordance with a determination that the duration of the gap is shorter than a first threshold duration and longer than a second threshold duration, means for determining an adjusted start point of the cyclic prefix extension earlier than the start point by extending the cyclic prefix extension, such that the duration of the gap is shortened to be shorter than the second threshold duration; and means for performing an LBT operation of a third type without a channel sensing.

In some example embodiments, the means for performing the operation comprises: in accordance with a determination that the duration of the gap is shorter than a first threshold duration and longer than a second threshold duration, means for dropping an LBT operation for the second transmission and the second transmission.

In some example embodiments, the means for performing the operation comprises: in accordance with a determination that the duration of the gap is longer than or equal to a first threshold duration which is longer than a second threshold duration, means for performing an LBT operation of a first type with a channel sensing for the first threshold duration.

In some example embodiments, the apparatus further comprises: means for receiving, from the further apparatus, a configuration message comprising time and frequency resources for the second transmission and the duration of the cyclic prefix extension; and means for determining the start point of the cyclic prefix extension based on the configuration message.

In some example embodiments, the apparatus further comprises: means for receiving a configuration message from the further apparatus; and means for determining, from the configuration message, the end point of the first transmission.

In some example embodiments, the apparatus further comprises: means for determining a timing advance value for the second transmission; and means for determining the start point of the cyclic prefix extension based on the timing advance value.

In some example embodiments, the first transmission is a downlink transmission, and the second transmission is a configured grant physical uplink shared channel, CG-PUSCH, transmission.

In some example embodiments, the apparatus comprises a terminal device, and the further apparatus comprises a network device.

In some example embodiments, the apparatus further comprises means for performing other steps in some example embodiments of the method 200. In some example embodiments, the means comprises at least one processor; and at least one memory including computer program code, the at least one memory and computer program code configured to, with the at least one processor, cause the performance of the apparatus.

Figure 8:
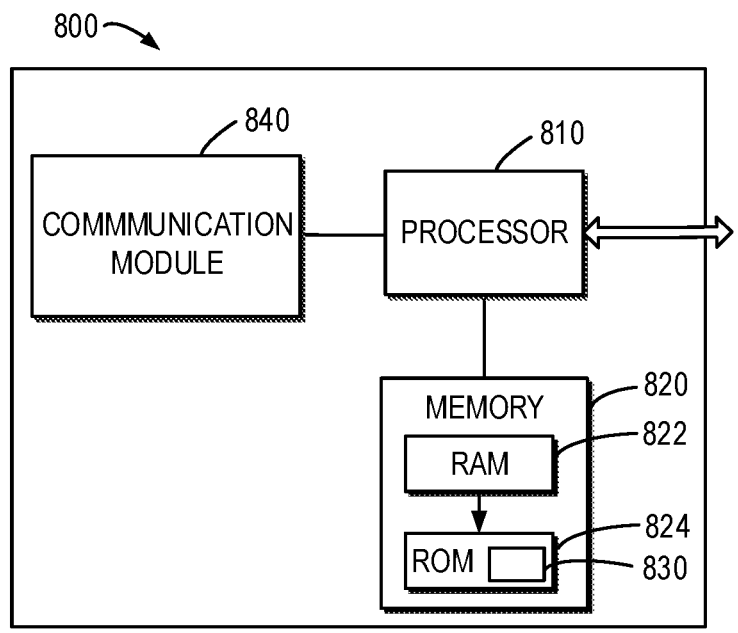
FIG. 8 illustrates a simplified block diagram of a device that is suitable for implementing example embodiments of the present disclosure.

FIG. 8 illustrates a simplified block diagram of a device 800 that is suitable for implementing example embodiments of the present disclosure. The device 800 may be provided to implement a communication device, for example the first device 110 and the second device 120 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has at least one antenna to facilitate communications. The communication interface may represent any interface that is necessary for communications with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The computer program 830 may be stored in the ROM 824. The processor 810 may perform any suitable actions and processing by loading the computer program 830 into the RAM 822.

The example embodiments of the present disclosure may be implemented by means of the computer program 830 so that the device 800 may perform any process of the disclosure as discussed with reference to FIG. 2. The example embodiments of the present disclosure may also be implemented by hardware or by a combination of software and hardware.

In some example embodiments, the computer program 830 may be tangibly contained in a computer readable medium which may be included in the device 800 (such as in the memory 820) or other storage devices that are accessible by the device 800. The device 800 may load the computer program 830 from the computer readable medium to the RAM 822 for execution. The computer readable medium may include any types of tangible non-volatile storage, such as ROM, EPROM, a flash memory, a hard disk, CD, DVD, and the like.

Figure 9:
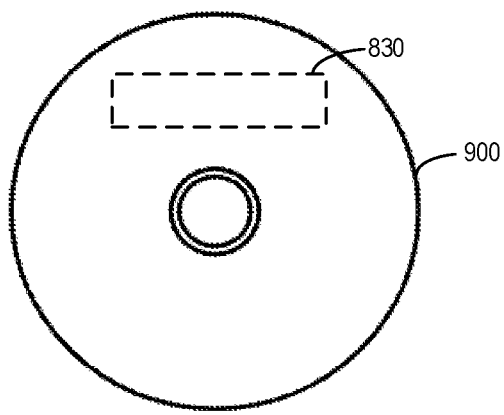
FIG. 9 illustrates a block diagram of an example computer readable medium in accordance with some example embodiments of the present disclosure.

FIG. 9 illustrates a block diagram of an example computer readable medium 900 in accordance with some example embodiments of the present disclosure. In the example of FIG. 9, the computer readable medium 900 is in form of CD or DVD. The computer readable medium 900 has the computer program 830 stored thereon.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, a computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single example embodiment. Conversely, various features that are described in the context of a single example embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
   at least one processor; and
   at least one memory storing computer program codes;
   the at least one memory and the computer program codes being configured, with the at least one processor, to cause the apparatus to:
   determine a duration of a gap between a first transmission and a second transmission;
   perform an operation related to a listen-before-talk (LBT) process for the second transmission based on comparisons between the duration of the gap and at least one threshold duration associated with a plurality of channel access types of LBT processes;
   receive, from a further apparatus, a configuration message comprising time and frequency resources for the second transmission and a duration of a cyclic prefix extension; and
   determine a start point of a cyclic prefix extension of the second transmission based on the configuration message.

2. The apparatus of claim 1, wherein the apparatus is caused to perform the operation by:
   in accordance with a determination that the duration of the gap is shorter than a first threshold duration and a second threshold duration which is shorter than the first threshold duration, performing the operation selected from a group comprising the following:
   performing an LBT operation of a first type with a channel sensing for the first threshold duration,
   performing an LBT operation of a second type with a channel sensing for the second threshold duration,
   performing an LBT operation of a third type without a channel sensing, or
   dropping an LBT operation for the second transmission and also dropping the second transmission.

3. The apparatus of claim 2, wherein the at least one memory and the computer program codes are further configured, with the at least one processor, to cause the apparatus to:
   in accordance with a determination that a duration of the second transmission is within a predetermined duration, perform the LBT operation of the third type.

4. The apparatus of claim 2, wherein the at least one memory and the computer program codes are further configured, with the at least one processor, to cause the apparatus to:
   in accordance with a determination that a duration of the second transmission exceeds a predetermined duration, determine an adjusted start point later than a start point of a cyclic prefix extension of the second transmission by shortening the cyclic prefix extension, such that the duration of the gap is extended to the second threshold duration; and
   perform the LBT operation of the second type.

5. The apparatus of claim 2, wherein the at least one memory and the computer program codes are further configured, with the at least one processor, to cause the apparatus to:
   in accordance with a determination that a duration of the second transmission exceeds a predetermined duration, determine an adjusted start point later than a start point of a cyclic prefix extension of the second transmission by shortening the cyclic prefix extension, such that the duration of the gap is extended to the first threshold duration; and
   perform the LBT operation of the first type.

6. The apparatus of claim 2, wherein the at least one memory and the computer program codes are further configured, with the at least one processor, to cause the apparatus to:
   in accordance with a determination that a duration of the second transmission exceeds a predetermined duration, drop the LBT operation for the second transmission and also drop the second transmission.

7. The apparatus of claim 1, wherein the apparatus is caused to perform the operation by:
   in accordance with a determination that the duration of the gap is equal to a second threshold duration which is shorter than a first threshold duration, performing an LBT operation of a second type with a channel sensing for the second threshold duration.

8. The apparatus of claim 1, wherein the apparatus is caused to perform the operation by:
   in accordance with a determination that the duration of the gap is shorter than a first threshold duration and longer than a second threshold duration,
   determining an adjusted start point later than a start point of a cyclic prefix extension of the second transmission by shortening the cyclic prefix extension, such that the duration of the gap is extended to the first threshold duration; and
   performing an LBT operation of a first type with a channel sensing for the first threshold duration.

9. The apparatus of claim 1, wherein the apparatus is caused to perform the operation by:
   in accordance with a determination that the duration of the gap is shorter than a first threshold duration and longer than a second threshold duration,
   determining an adjusted start point earlier than a start point of a cyclic prefix extension of the second transmission by extending the cyclic prefix extension, such that the duration of the gap is shortened to the second threshold duration; and performing an LBT operation of a second type with a channel sensing for the second threshold duration.

10. The apparatus of claim 1, wherein the apparatus is caused to perform the operation by:

in accordance with a determination that the duration of the gap is shorter than a first threshold duration and longer than a second threshold duration, determining an adjusted start point earlier than a start point of a cyclic prefix extension of the second transmission by extending the cyclic prefix extension, such that the duration of the gap is shortened to be shorter than the second threshold duration; and performing an LBT operation of a third type without a channel sensing.

11. The apparatus of claim 1, wherein the apparatus is caused to perform the operation by:

in accordance with a determination that the duration of the gap is shorter than a first threshold duration and longer than a second threshold duration, dropping an LBT operation for the second transmission and also dropping the second transmission.

12. The apparatus of claim 1, wherein the apparatus is caused to perform the operation by:

in accordance with a determination that the duration of the gap is longer than or equal to a first threshold duration which is longer than a second threshold duration, performing an LBT operation of a first type with a channel sensing for the first threshold duration.

13. The apparatus of claim 1, wherein the at least one memory and the computer program codes are further configured, with the at least one processor, to cause the apparatus to:

receive a configuration message from a further apparatus; and determine, from the configuration message, an end point of the first transmission.

14. The apparatus of claim 1, wherein the at least one memory and the computer program codes are further configured, with the at least one processor, to cause the apparatus to:

determine a timing advance value for the second transmission; and determine a start point of a cyclic prefix extension based on the timing advance value.

15. The apparatus of claim 1, wherein the first transmission is a downlink transmission, and the second transmission is a configured grant physical uplink shared channel (CG-PUSCH) transmission.

16. The apparatus of claim 1, wherein the apparatus comprises a terminal device.

17. A method comprising:

determining, at an apparatus, a duration of a gap between a first transmission and a second transmission;

performing an operation related to a listen-before-talk (LBT) process for the second transmission based on comparisons between the duration of the gap and at least one threshold duration associated with a plurality of channel access types of LBT processes;

receiving, from a further apparatus, a configuration message comprising time and frequency resources for the second transmission and a duration of a cyclic prefix extension; and determining a start point of a cyclic prefix extension of the second transmission based on the configuration message.

18. A non-transitory computer readable medium comprising program instructions for causing an apparatus to:

determine a duration of a gap between a first transmission and a second transmission;

perform an operation related to a listen-before-talk (LBT) process for the second transmission based on comparison between the duration of the gap and at least one threshold duration associated with a plurality of channel access types of LBT processes;

receive, from a further apparatus, a configuration message comprising time and frequency resources for the second transmission and a duration of a cyclic prefix extension; and determine a start point of a cyclic prefix extension of the second transmission based on the configuration message.

* * * * *